United States Patent
Rajan

(10) Patent No.: US 9,549,296 B2
(45) Date of Patent: Jan. 17, 2017

(54) OPTIMIZING BACKHAUL AND WIRELESS LINK CAPACITY IN MOBILE TELECOMMUNICATION SYSTEMS

(71) Applicant: Alcatel Lucent, Boulogne Billancourt (FR)

(72) Inventor: Govinda Rajan, Huizen (NL)

(73) Assignee: Alcatel Lucent, Boulogne-Billancourt (FR)

( * ) Notice: Subject to any disclaimer, the term of this patent is extended or adjusted under 35 U.S.C. 154(b) by 18 days.

(21) Appl. No.: 14/391,875

(22) PCT Filed: Feb. 28, 2013

(86) PCT No.: PCT/EP2013/000594
§ 371 (c)(1),
(2) Date: Oct. 10, 2014

(87) PCT Pub. No.: WO2013/152820
PCT Pub. Date: Oct. 17, 2013

(65) Prior Publication Data
US 2015/0079958 A1    Mar. 19, 2015

(30) Foreign Application Priority Data
Apr. 10, 2012    (EP) .................................... 12290125

(51) Int. Cl.
*H04W 4/02* (2009.01)
*H04W 4/06* (2009.01)
(Continued)

(52) U.S. Cl.
CPC ............ *H04W 4/06* (2013.01); *H04L 67/2842* (2013.01); *H04W 4/18* (2013.01); *H04W 8/183* (2013.01); *H04W 60/00* (2013.01)

(58) Field of Classification Search
CPC .................................. H04W 4/06; H04W 4/02
(Continued)

(56) References Cited

U.S. PATENT DOCUMENTS 6,757,796 B1    6/2004 Hofmann
2005/0198359 A1*    9/2005 Basani et al. ................. 709/232
(Continued)

FOREIGN PATENT DOCUMENTS

JP    10-275108 A    10/1998
JP    2001-282609 A    10/2001
(Continued)

OTHER PUBLICATIONS

International Search Report for PCT/EP2013/000594 dated Jun. 17, 2013.
(Continued)

*Primary Examiner* — Kevin Kim
(74) *Attorney, Agent, or Firm* — Fay Sharpe, LLP

(57) ABSTRACT

To overcome the problem of limited backhaul capacity and limited wireless channel capacity when downloading videos to smart phones, a method for transmission of data across a mobile telecommunications network, includes providing each Smartphone or other user station (Ua-Ud) with a memory cache (12) and a download app (10), and providing a server (2) in the core network with a server cache memory (16) and a download control app (14). Each user registers with the server, the server gathers information of internet web sites (URLn) accessed by the users from which downloads may be made, monitors the websites, and as and when updates appear on the websites, selectively downloads the updates in the server cache. There is then established a common data channel from the server, across base stations (3), to the users in order to download the updates to the user's memory cache (12).

10 Claims, 4 Drawing Sheets

(51) Int. Cl.
    *H04W 4/18*     (2009.01)
    *H04L 29/08*    (2006.01)
    *H04W 8/18*     (2009.01)
    *H04W 60/00*    (2009.01)

(58) Field of Classification Search
    USPC .............................. 455/414.1, 414.2, 414.3
    See application file for complete search history.

(56) References Cited

U.S. PATENT DOCUMENTS

2013/0031197 A1*  1/2013  Delos Reyes et al. ....... 709/213
2013/0081072 A1*  3/2013  Alward et al. .................. 725/14

FOREIGN PATENT DOCUMENTS

| JP | 2002-51006 A | 2/2002 |
| JP | 2003-526267 A | 9/2003 |
| JP | 2005-303744 A | 10/2005 |
| WO | WO 99/66747 A2 | 12/1999 |
| WO | WO 01/65817 A1 | 9/2001 |

OTHER PUBLICATIONS

Alcatel, MBMS service initiation, 3GPP TSG-SA WG2#24 S2-021233, Apr. 26, 2002, http://www.3gpp.org/ftp/tsg_sa/WG2_Arch/TSGS2_24/tdocs /s2-021233.zip.

* cited by examiner

OPTIMIZING BACKHAUL AND WIRELESS LINK CAPACITY IN MOBILE TELECOMMUNICATION SYSTEMS

FIELD OF THE INVENTION

The present invention relates to a means and method for improving data transmission flow rates in mobile telecommunications systems.

BACKGROUND ART

With increasing popularity of smart phones, the amount of internet data access by mobile phones is experiencing a so called "wireless data explosion". A smart phone is generally regarded as a mobile phone built on a mobile computing platform and including a mobile operating system, with advanced computing ability and connectivity and include functions such as portable media players and GPS navigation units. Smart phones typically include web browsers, and high-speed data access via Wi-Fi and mobile broadband. The most common mobile operating systems (OS) used by current smart phones include for example Apple's iOS, Google's Android, Microsoft's Windows Phone, Nokia's Symbian, RIM's BlackBerry OS. Operating Systems support "apps", which are software applications which carry out certain specific functions and are either pre-installed or are downloaded by the user from an "app store".

It is common knowledge that mobile (smart) phone users of many large telecom operators are experiencing connectivity problems. The two main reasons for this are that (1) the backhaul network capacity between the wireless base stations and the core network is limited and (2) the capacity of the wireless channels from the base station antennas to the mobile phones are not sufficient to handle the amount of data requested by the mobile phones.

It is known to address the issue of limited backhaul capacity by implementing a cache. In fixed networks, e.g. corporate networks, web caching, which is a mechanism for the temporary storage (caching) of web documents, such as HTML pages and images, is generally carried out at a proxy server. The proxy server is then used for a group of corporate users based on proxy server capacity, geographical locations, etc. Web caching may be extended to mobile systems, where the cache may be at the base station (i.e. at the antenna site). However a drawback is that a caching server has to be installed at the numerous base stations of the system, which is both expensive, both in terms of cost and time to install. As an alternative, the proxy server may not be located in the base station, but may be located in the core network of the mobile system and might serve multiple handsets via multiple base-stations. But this does not make efficient use of the radio channels, since each handset uses a dedicated radio channel for getting the data from the proxy server.

As regards the issue of limited wireless channel capacity in the air interface between a base station and mobile handsets, there is a broadcast feature available in the mobile networks but this is usually employed only for the TV like broadcasting. Here all users who want to view a certain content channel can connect to the already streaming channel. A proposal for streaming applications of real-time data such as video is multicasting, where selected users subscribe to a service, see for example Multimedia Broadcast Multicast Service (MBMS), which is a standard defined by 3GPP. The streaming service is transmitted over the wireless interface, but only those users who have subscribed to the service are permitted to view the real time data being transmitted. A disadvantage is that this multicast method is designed for real-time data such as video where the user needs to join and watch the current video.

SUMMARY OF THE INVENTION

The present invention provides in a first aspect, a method for transmission of data across a mobile telecommunications network, the network comprising a plurality of user stations, a plurality of cell stations, and a central network, wherein each of said user stations includes user memory storage means, and the central network including a server means, which includes server memory storage means wherein the method comprises registering each said user station with said server means, said server means deriving an indication from each registered user station of internet web sites accessed by the user station from which downloads may be made, said server means monitoring said websites, and as and when new data items appear on said websites, selectively storing said data items in said server memory storage means, and establishing a common data channel from said server means, across said cell stations, to said user stations in order to download selected data items to the user memory storage means of each said user station.

The present invention provides in a second aspect apparatus for transmission of data across a mobile telecommunications network, the network comprising a plurality of user stations, a plurality of cell stations, and a central network, wherein each user station includes a registration and download means, and a user memory storage means, the central network including a server means arranged to communicate with said user stations, and including a server memory storage means, said server means having a download control means for registering said user stations, and to derive an indication from each user station of internet web sites accessed by the user station from which downloads may be made, said server download control means being arranged to monitor said websites, and as and when new data items appear on said websites, to selectively store said data items in said server memory storage means and said server download control means being arranged to establish a common data channel between said server means, across said cell stations to said user stations, in order to selectively download data items stored in said server memory storage means to the memory storage means of each said user station.

The method and apparatus as set forth above provide a non-streaming multicasting application, in that a multicasting function provides data from a single source to a large number of registered user stations, and the data is provided on a non-streaming basis, that is the data may be accessed as and when the user requires, not only when the data is available on a transmitting data channel.

Embodiments of the invention are applicable to all existing or proposed mobile telecommunications systems which support data transmission, including 2G systems such as GSM, 3G systems such as UMTS, and 4G systems such as LTE.

In the present specification, the term "user station" is intended to cover mobile stations, handsets, user equipment, tablets, mobile dongles, and all such stations that may move between cells of a mobile system. It will be appreciated that in embodiments of the invention, a plurality of user stations are provided registered to said server means, although there may be other user stations which do not so subscribe.

The term "cell station" is intended to cover in the present specification base stations, Node B's (NB), eNode B's (eNB), and other radio transmission stations which define a radio cell of a mobile network. It will be appreciated that in embodiments of the invention, a plurality of cell stations are provided, although it may be necessary in any particular instance to transmit data only from those cell stations in whose cell is located one or more of said user stations.

The term "central network", for the purposes of the present specification, is intended to cover the remaining part of the mobile system, apart from said user stations and said cell stations, and which will interface with the Internet (and other networks such as PSDN) and which includes: a) for UMTS systems, the core network (CN) and radio network controllers (RNC); b) for GSM, Base station Controllers (BSC) and Network and Switching Subsystem (NSS) and Mobile Services Switching Centre (MSC); and c) for LTE, Serving Gateway (SGW), Mobility Management Entity (MME), and Packet Data Network Gateway (PDN GW) (In LTE, a Radio Access Network is contained within each eNB).

In embodiments of the invention, said common data channel is a network layer high level channel, as opposed to lower level transport and physical channels. In the air interface between each said cell station and said user stations, said common data channel comprises a common broadcast channel, so that said data items are transmitted to all user stations within the cell of the cell station. Such common broadcast channel is to be distinguished from lower level channels of some mobile systems that bear the name "broadcast".

Said common data channel is established when it is desired to transmit data items to said user stations, and the channel is closed when the transmission is completed. Transmission may be carried out in time periods of reduced network usage.

In an embodiment, users subscribe to a caching service and install an app on handset. The app on a user's handset registers with a server in the central (core) network. The server in the core network keeps track of users and the common websites shared between the users. When there is an update to the data in a common website (e.g. a new YouTube video which becomes viral, meaning that it comes into the top 25 list), the server sets up a common data channel (which is a high level logical channel, as opposed to a transport channel or physical channel) and transmits the data on the data channel and all the subscribed users to that website will pull off the data from the single data channel and cache it locally. Then when a certain user brings up on his handset that website, the data would be loaded into the browser from the cached data by the app. In this way a single data channel is used instead of multiple transport channels (both on the fixed core network and the wireless network). Thus less capacity is used on the fixed core network and wireless channels.

This also actually increases user experience, since when a certain user wants to access say a certain popular YouTube video, the data is already available locally on the mobile terminal, so it starts up at once without world-wide-waiting time.

BRIEF DESCRIPTION OF THE DRAWINGS

Embodiments of the invention will now be described, by way of example only, with reference to the accompanying drawings, wherein.

DESCRIPTION OF AN EMBODIMENT

Figure 1:
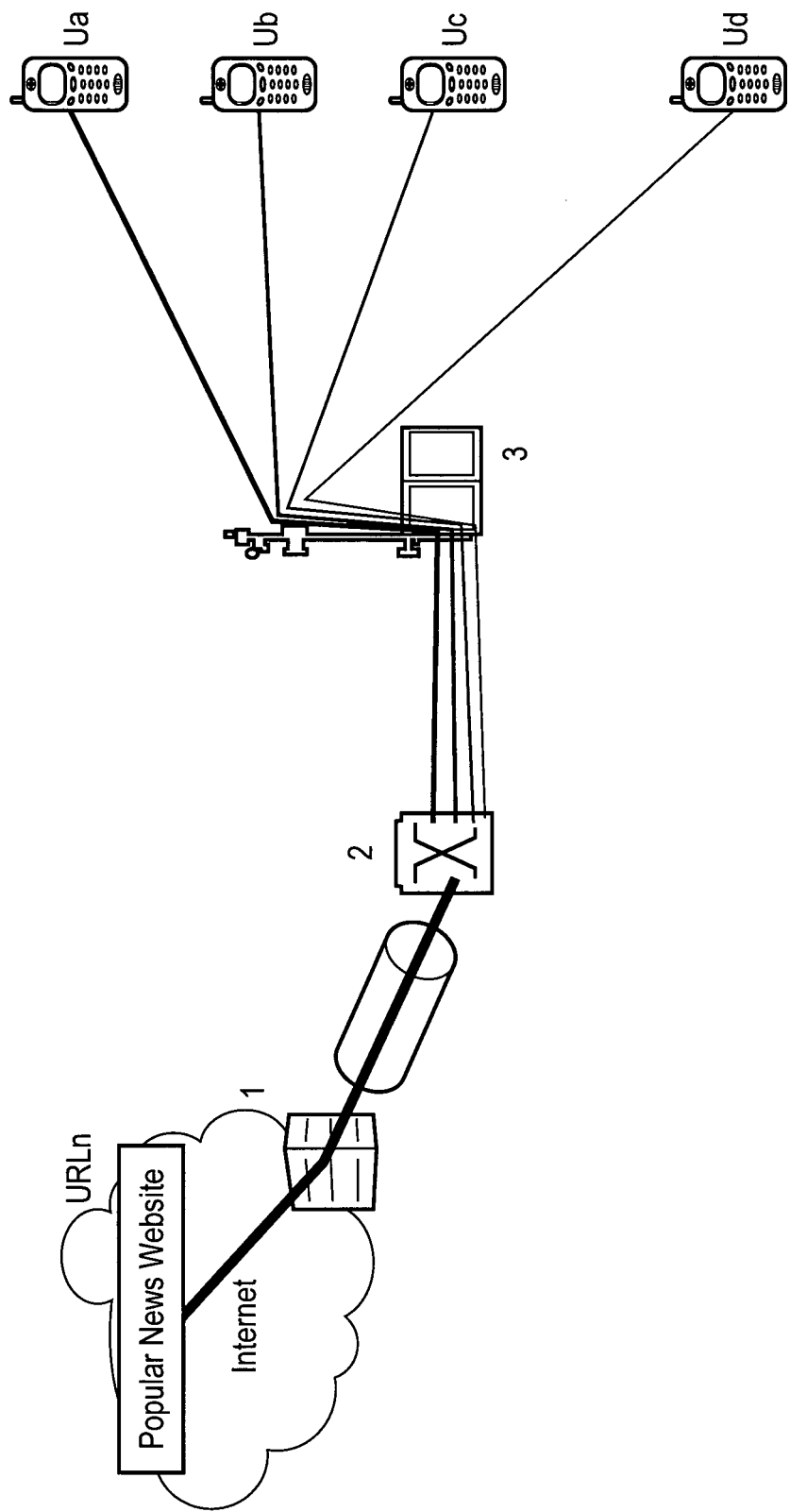
FIG. 1 is a diagram illustrating a configuration of a known method of distributing data to mobile user handsets.

Referring to FIG. 1, this illustrates a known method of User Stations Ua, Ub, Uc, Ud accessing an Internet Website URLn, in this example a popular news website. A central network of the mobile system includes a gateway connector 1 to the Internet (e.g. for LTE—PDNGW; UMTS—GGSN; GSM—GGSN), and a node 2 comprising a router or network switch. A cell station 3 includes a radio antenna and base station functionalities, appropriate to the mobile system employed (e.g. an eNB for LTE includes full Radio Access Network functionality). In known procedures for viewing URLn, each user sets up a separate socket connection to the gateway connector 1 (a "socket connection" is a known mechanism for making a connection to the internet, and involves specifying local IP address, remote IP address, and protocol used, e.g. TCP, STCP), and each user downloads the appropriate web page, which may include video.

Hence in this procedure, four independent data connections are established across the central network and the wireless interface of the mobile system. This may clearly become expensive in terms of the backhaul capacity and the wireless link capacity, especially where it is necessary to download video.

Figure 2:
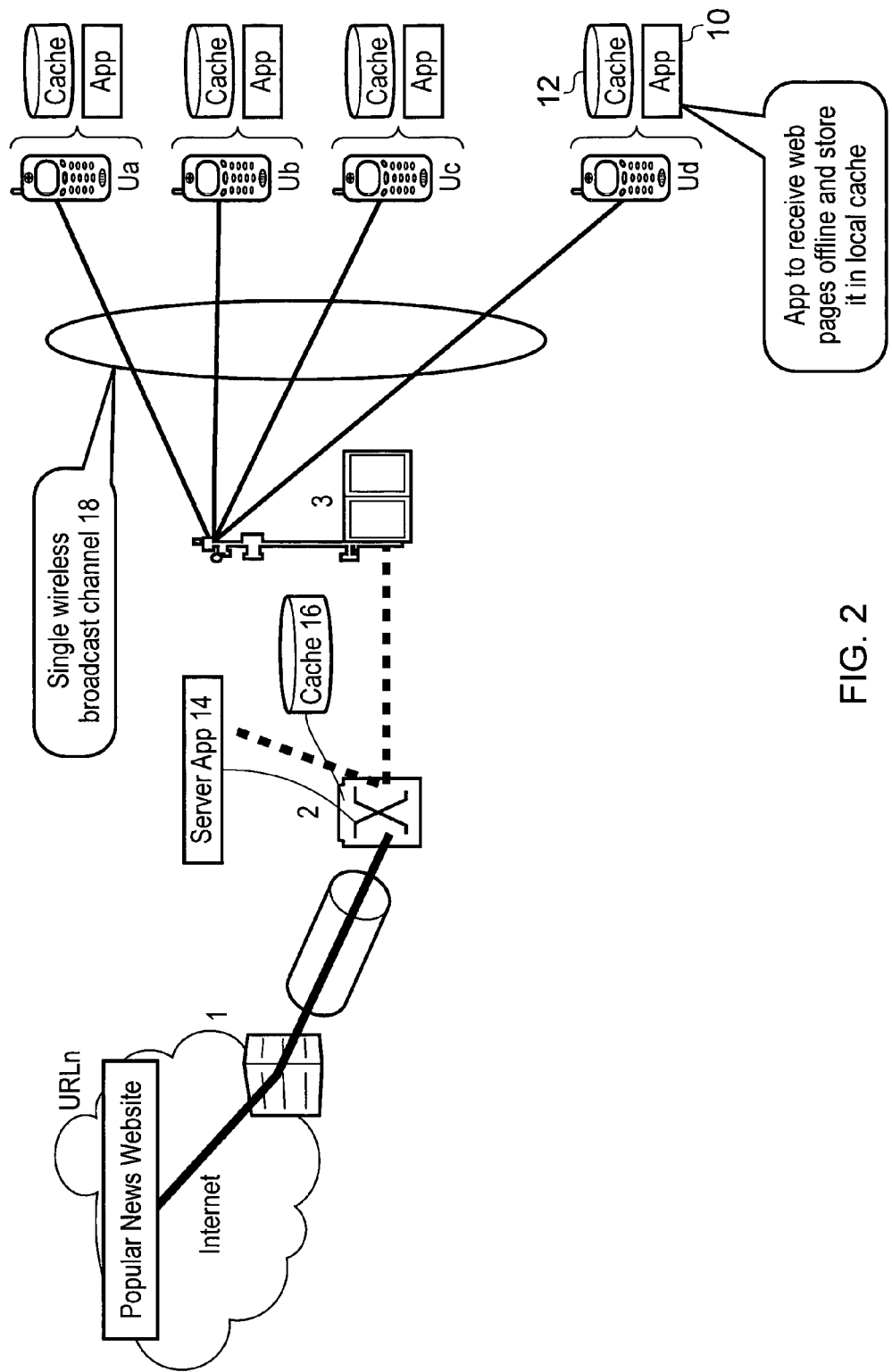
FIG. 2 is a diagram illustrating a configuration of a mobile phone system and incorporating an embodiment of the invention.

Referring now to FIG. 2, this illustrates an embodiment of the invention, wherein similar parts to those of FIG. 1 are denoted by the same reference numeral. Each user station Ua, Ub, Uc, Ud includes an App 10, and a memory cache 12, reserved for the App. The network node 2 includes a server having a Server download control App 14, which is a non-streaming multicasting server app, and a memory cache 16 reserved for the App 14.

The procedure of this embodiment is that the system operator will firstly install App 14 in server node 2, and reserve an appropriate amount of memory in cache 16. Client Apps 10 are installed in the handsets, either prior to sale, or subsequently by the user by downloading from an App "store". Each user will then employ a registration procedure present in the App to register with the download service, and complete all necessary formalities, identification, payment etc. At that point or subsequently, the user may configure the client app 10 with one or more websites of interest to the user and which may from time to time contain updates and revisions in terms of new downloadable files, in the form of videos or other multimedia files, or data files. (The tendency is that a majority of users access similar sites such as local news sites often).

Server App 14 may in addition monitor internet transactions carried out by subscribing users, and may add frequently accessed sites to the lists of sites of interest, which are maintained by the Server App for each user. Server App may function for each site accessed by each user, or may only function for a subset of those sites which are accessed by more than a minimum number of users. In any event, the Server App functions to review listed websites. When updates or revisions appear on the website, and which satisfy certain requirements, e.g. in the case of a news website, a new "headline" item or a new sports report, or in the case of YouTube, a new video clip becoming "viral" (that is a certain large number of users have viewed the clip), then the server will download this data, for example in the form of a new web page or a data item from a web page. In some cases, a web page may be downloaded into server memory cache 16, and as and when updates appear on the website, updated items may be downloaded into the cached web page.

Figure 3:
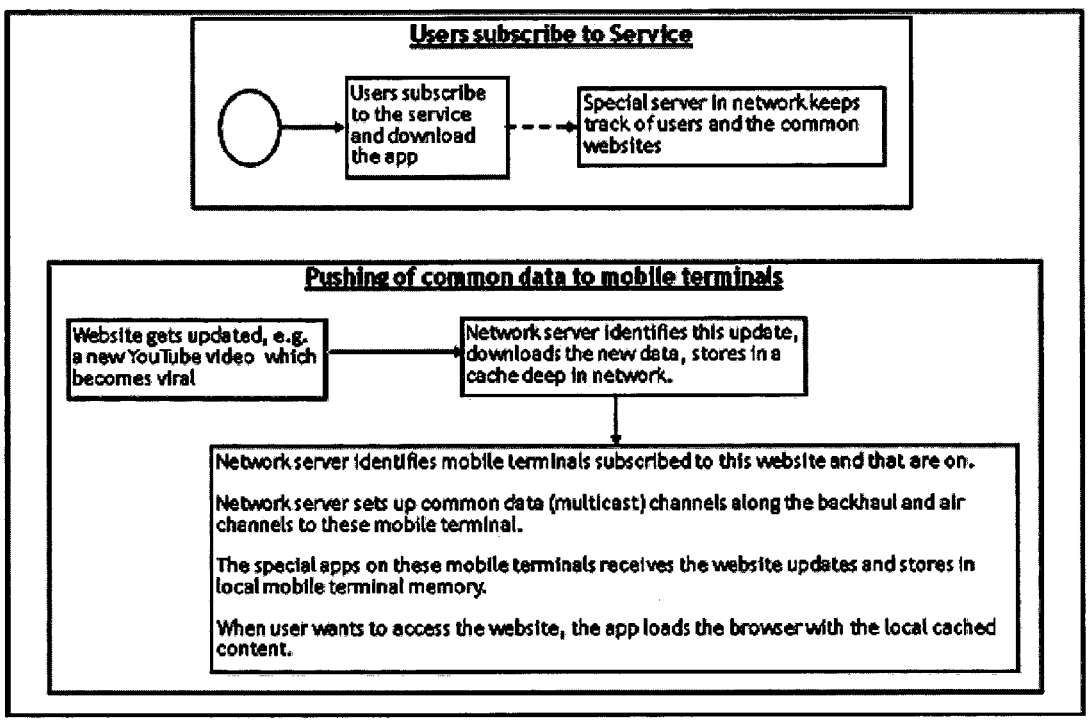
FIG. 3 is a schematic flow chart of the method of operation of the embodiment of FIG. 2.

Thus as indicated in FIG. 3, in operation, subsequent to users registering, the server app 14 downloads updates from monitored websites, and stores the update in its cache 16. This may be done by establishing standard point to point socket connections between the website and server.

Whenever cache 16 is updated, or when cache 16 receives a predetermined volume of update data, the server app 14 identifies the handsets subscribing to the service, and to which cell stations they are located, and sets up a common data channel (multicast channel) to those parts of the system where the handsets are located. Server App 14 then pushes the updated data to the handsets using the common data channel both in the central network wired connection between node 2 and cell stations 3, and the wireless connections between stations 3 and handsets Ua-Ud. This may be done at off-peak instants when network usage is reduced. The data connection between stations 3 and handsets Ua etc is implemented by means of a broadcast channel 18. This broadcast channel is a high level logical channel which broadcasts to all cells within the area of a cell station. This broadcast channel may map on to appropriate transport and physical layer channels. However only those handsets which are registered with the data service will be enabled to download the data. So-called broadcast channels are generally used only for streaming data (with streaming data, handsets can join or leave the data stream at any time, but they can only access the data current on the channel—this is convenient for broadcast TV where all users watch the same programme at the same time).

Figure 4:
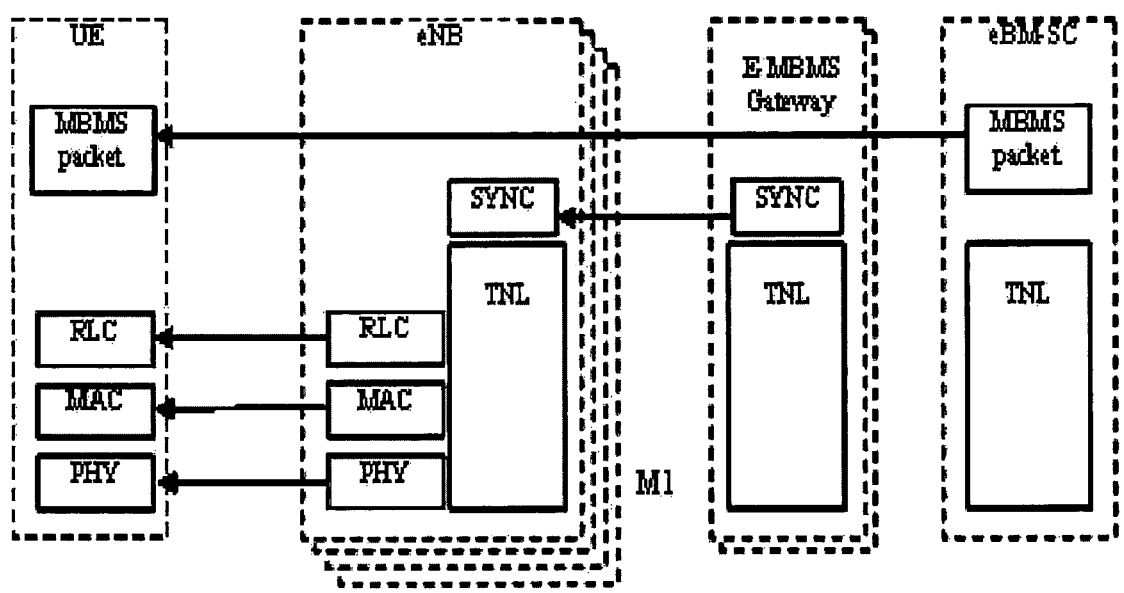
FIG. 4 is a schematic of MBMS architecture employed to implement the embodiment of this invention.

In one embodiment, the common data channel is implemented by means of the MBMS protocol (see e.g. 3GPP TS 23.246), which is usually present in LTE systems—see e.g.3GPP TS 36.300. FIG. 4 shows an architecture of the MBMS system. In this embodiment the server app 14 functions or forms part of the eMBM-SC unit and the E-MBMS gateway. Data transmission occurs directly from the eBM SC to each user station Ua-Ud, by means of a data channel, referred to in the MBMS standard as MTCH logical channel. This in the present embodiment maps onto appropriate transport and physical channels, as determined by the eNB.

The client apps in the handsets on receiving the data on the broadcast channel store the data in the respective caches 12. When the user of the handset requests access the appropriate website, app 10 intercepts the request and the data in the local cache is displayed—as opposed to the previous method of downloading a webpage from the internet website across the mobile system data network, thereby saving use of a wireless data channel at the time of viewing, and saving backhaul bandwidth.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for transmission of data across a mobile cellular telecommunications network, the network comprising a plurality of user stations (Ua-Ud), a plurality of cell stations, and a central network, wherein each user station includes a user memory storage device, and the central network including a server, which includes server memory storage device, the method comprising:

said server registering each user station, said server maintaining a record of each user station, and maintaining a list for each user station of Internet web sites (URLn) accessed by the user station from which downloads may be made, said server monitoring said websites, and as and when new data items appear on said websites, selectively storing said data items in said server memory storage device, and selectively establishing a common data channel from said server, across said cell stations, to said user stations in order to download selected said data items on a non-streaming basis to the user memory storage device of each said user station, so that when a user subsequently requests access to said data item, the user is directed to the corresponding data item stored in said user memory storage device;

wherein the common data channel is selectively established when the server receives a predetermined volume of update data.

2. A method as claimed in claim 1, wherein in the air interface between said cell stations and said user stations, said common data channel comprises a common broadcast channel so as to broadcast said data items to all user stations within the area of the cell of each cell station.

3. A method as claimed in claim 1, wherein said server is configured to establish said common data channel only to those cell stations to which registered user stations are attached.

4. A method as claimed in claim 1, wherein said server establishes said common data channel using the MBMS protocol.

5. A method as claimed in claim 1, wherein said server stores one or more selected web pages, and updates a stored webpage with new data items as and when they appear on the website of the selected web page.

6. An apparatus for transmission of data across a mobile cellular telecommunications network, the apparatus comprising:

a server configured to communicate with user stations, and including a server memory storage device, said server having a download controller configured to register said user stations, maintain a record of each user station, and maintain a list for each user station of internet web sites (URLn) accessed by the user station from which downloads may be made, said server download controller configured to monitor said websites, and as and when new data items appear on said websites, to selectively store said data items in said server memory storage device, and said server download controller configured to selectively establish a common data channel between said server, across said cell stations to said user stations, in order to selectively download data items stored in said server memory storage device to the memory storage device of each said user station on a non-streaming basis, so that when a user subsequently requests access to said data item, the user is directed to the corresponding data item stored in said user memory storage device;

wherein said server download controller is further configured to selectively establish the common data channel when the server receives a predetermined volume of update data.

7. An apparatus as claimed in claim 6, wherein in the air interface between said cell stations and said user stations, said common data channel comprises a common broadcast channel so as to broadcast said data items to all user stations within the area of the cell of each cell station.

8. An apparatus as claimed in claim 6, wherein said server is configured to establish said common data channel only to those cell stations to which registered user stations are attached.

9. An apparatus according to claim 6, wherein said server is arranged to establish said common data channel by use of the MBMS protocol.

10. An apparatus according to claim 6, wherein said server is configured to store one or more selected web pages, and update the stored webpage with new data items as and when they appear on the website of the selected web page.

* * * * *